United States Patent [19]
Burgmer

[11] Patent Number: 5,126,530
[45] Date of Patent: Jun. 30, 1992

[54] METHOD FOR PRODUCING HOLLOW GAS EXCHANGE VALVES FOR RECIPROCATING ENGINES

[75] Inventor: Heinrich Burgmer, Friedrichsdorf, Fed. Rep. of Germany

[73] Assignee: Mercedes-Benz AG, Fed. Rep. of Germany

[21] Appl. No.: 619,517

[22] Filed: Nov. 29, 1990

[30] Foreign Application Priority Data

Nov. 29, 1989 [DE] Fed. Rep. of Germany ....... 3939348
Jul. 28, 1990 [DE] Fed. Rep. of Germany ....... 4024084

[51] Int. Cl.$^5$ ............................................. B23K 26/00
[52] U.S. Cl. .......................... 219/121.64; 219/121.14; 219/121.46; 219/137 R
[58] Field of Search ................. 219/121.63, 121.64; 123/188 AA

[56] References Cited

U.S. PATENT DOCUMENTS

| | | | |
|---|---|---|---|
| 1,628,911 | 5/1927 | Rich | 123/90.51 |
| 2,793,281 | 5/1957 | Steigerwald | 219/69 |
| 2,989,614 | 6/1961 | Steigerwald | 219/50 |
| 3,192,318 | 6/1965 | Schleich et al. | 178/6.8 |
| 3,513,285 | 5/1970 | Imura | 219/121 |
| 3,644,700 | 2/1972 | Kruppa et al. | 219/121 |
| 3,699,304 | 10/1972 | Baldwin et al. | 219/121 |
| 3,699,334 | 10/1972 | Cohen et al. | 250/49.5 |
| 3,710,773 | 1/1973 | Piech et al. | 123/188 AA |
| 3,894,271 | 7/1975 | Pfeiffer et al. | 315/384 |
| 3,900,736 | 8/1975 | Michail et al. | 250/492 |
| 3,956,052 | 5/1976 | Koste et al. | 156/247 |
| 4,199,689 | 4/1980 | Takigawa | 250/492 |
| 4,425,829 | 1/1984 | Kranik et al. | 83/62.1 |
| 4,467,170 | 8/1984 | Hata et al. | 219/121 |
| 4,544,442 | 10/1985 | Lassen | 156/643 |
| 4,555,610 | 11/1985 | Polad et al. | 219/121 |
| 4,595,819 | 6/1986 | Koch | 219/121 |
| 4,789,770 | 12/1988 | Kasner | 219/121.7 |
| 4,821,614 | 4/1989 | Fleet et al. | 83/100 |
| 4,831,230 | 5/1989 | Lemelson | 219/121.12 |

FOREIGN PATENT DOCUMENTS

| | | |
|---|---|---|
| 1927613 | 12/1970 | Fed. Rep. of Germany . |
| 2361712 | 2/1975 | Fed. Rep. of Germany . |
| 917196 | 9/1946 | France ............... 123/188 AA |
| 471605 | 9/1937 | United Kingdom ........ 123/188 AA |
| 489384 | 7/1938 | United Kingdom ........ 123/188 AA |
| 532184 | 1/1941 | United Kingdom ........ 123/188 AA |

OTHER PUBLICATIONS

W. Koste, "Electron Beam Processing of Interconnection Structures in Multi-Layer Ceramic Modules", *Metallurgical Transactions*, vol. 2, Mar., 1971, pp. 729-731.

"High Speed and Fine-Hole Processing Technology by a Pulsed Electron Beam", Application Machine Engineering, Jul., 1987, pp. 1-6.

Martin, "Wave of Advances Carry DSPs to New Horizons", *Computer Design*, Sep. 15, 1987, pp. 69-83.

Contolini et al., "Multiple DSPs Provide Speed for Digital Servo Control", *Computer Design*, Sep. 15, 1987, p. 87-92.

Hammond et al., IBM TDB, vol. 32, No. 5A, Oct., 1989, pp. 452-454, "Multiple Digital Signal Processor Circuit Cards for Tool Control Applications".

Primary Examiner—C. L. Albritton
Attorney, Agent, or Firm—Evenson, Wands, Edwards, Lenahan & McKeown

[57] ABSTRACT

A method produces hollow gas exchange valves, in particular with a cooling medium introduced into the hollow valve stem. The hollow of the valve stem is preferably drilled from the valve head side and, after the introduction of the cooling medium, sealed again by surfacing. A thin filling piece is inserted to a defined depth into the drilled hole temporarily holding the weld pool of the surfacing weld. By means of surfacing, it is possible to achieve cost savings over other sealing methods. The surfacing is preferably performed by a welding method in which the workpiece is not part of an electric circuit through which the welding energy flows. Preferable methods include gas welding, electron-beam welding or laser welding. With these methods, so-called edge effects can be avoided.

16 Claims, 7 Drawing Sheets

METHOD FOR PRODUCING HOLLOW GAS EXCHANGE VALVES FOR RECIPROCATING ENGINES

BACKGROUND AND SUMMARY OF THE INVENTION

The invention relates to a method for producing hollow gas exchange valves for reciprocating engines as known, for example, from German Offenlegungsschrift 2,361,712.

In the printed publication mentioned, the application on the head side of the drilled hole seal is already mentioned as a previously known measure and also sketched in a drawing and critically assessed. The actual recommendation given in the above printed publication for sealing the cavity of cooled gas exchange valves takes an entirely different direction. During the above-mentioned sealing of the cavity at the head side, a true-to-size circular blank of a thickness corresponding to the wall thickness of the sealing plug is inserted into the drilled hole and welded into it by means of miniature welding. An aspect of the known procedure which may be criticized in connection with the present invention is that the sealing plugs, which in general consist of a high-grade alloyed material, can only be produced with high material losses in the form of machining or stamping losses In addition, the methods for producing these sealing plugs are expensive, in particular because the high-grade and tough material requires high tool costs for processing. A precise, localizable weld for seal welding the sealing plug requires a high precision positioning device, with the result that only a very expensive welding fixture can be used for this purpose, which likewise adds to the costs of the method. In addition, the welding methods preferred in this context, such as laser or electron beam welding, require a relatively involved and expensive testing technology for process and quality assurance. This involved testing also adds to the costs of the known method.

In addition to welding a sealing plug inserted true-to-size into the drilled hole by miniature welding, it is also known to seal cooled gas exchange valves from the head side, a sealing plug of high-grade material being placed and welded into a precentering portion of the open drilled hole end by butt-seam resistance welding. In principle, the same points of criticism apply to this method too, such as high material consumption due to machining or stamping losses, separate production of a sealing plug, and relatively high costs for process and quality assurance. In this method too, these points have the effect of increasing costs.

It is the object of the invention, starting from the generic method taken as a basis, to develop this method further such that the gas exchange valves can be produced more economically with the same reliability.

This object is achieved according to the invention. By virtue of the introduction of the material of the sealing plug by surfacing, the separate operation of producing the sealing plug is eliminated, with the result that not only are the costs for this operation saved but that machining waste or punchings for a very expensive material are also avoided. Moreover, the surfacings can be performed by means of conventional, easily manageable welding methods and using relatively cheap machines. Initial tests justify the expectation that a reliability check as regards tightness can be omitted. Defective welds can be detected externally by a simple-to-perform visual check. It is expected that outwardly satisfactory welds will also be reliably tight overall. The thin-walled circular blank for holding the welding melt, which also is produced with material losses, can be produced from a cheap and easily worked material, reducing the material waste without significantly effecting costs. Due to the thin wall thickness and the low strength of this material, a long service life can be expected of the tools used, keeping costs low.

BRIEF DESCRIPTION OF THE DRAWINGS

The invention is explained below by means of various illustrative embodiments depicted in the drawings, in which.

DETAILED DESCRIPTION OF THE PREFERRED EMBODIMENTS

Figure 1:
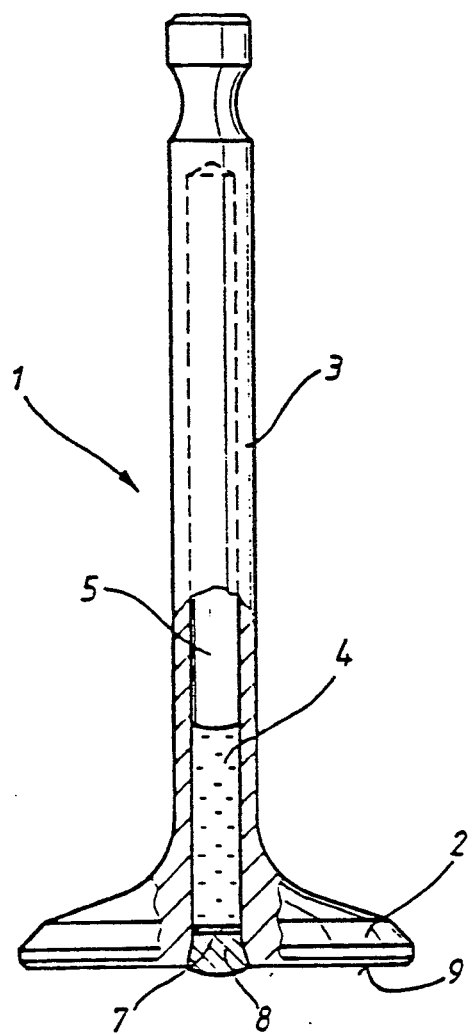
FIG. 1 shows a detailed representation of an illustrative embodiment of a gas exchange valve.

The coolable gas exchange valve for reciprocating engines depicted in FIG. 1 has a valve head 2 and a valve stem 3, the latter having a hollow 6 which is partially filled with a cooling medium 4, preferably sodium. The hollow 6, in the form of a drilled hole 6, is closed on the head side by a sealing plug 8. Further details of the application of the sealing plug 8 are given below.

Figure 2:
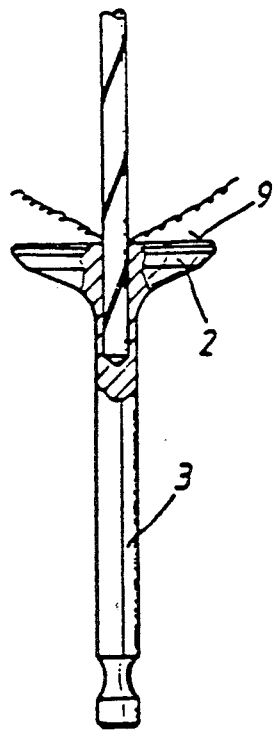
FIGS. 2 to 5 show four different steps in the production of the gas exchange valve according to FIG. 1.
Figure 3:
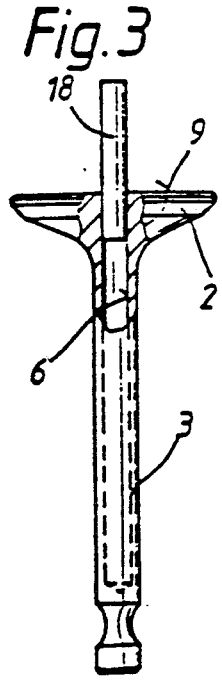
Figure 4:
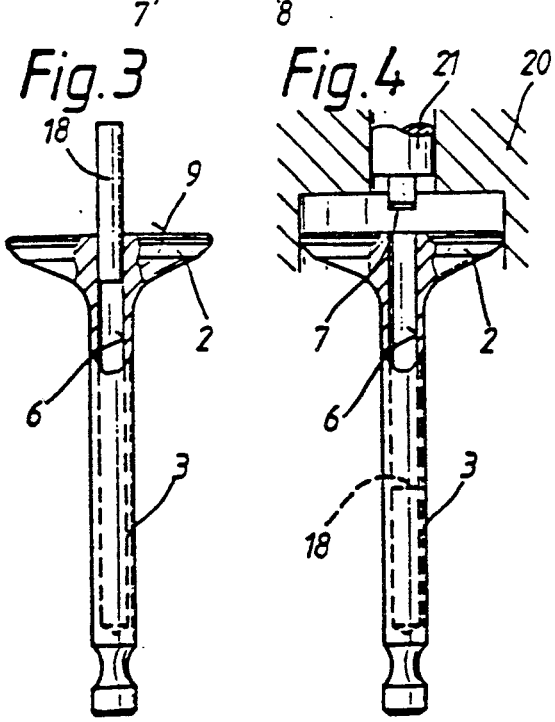
Figure 5:
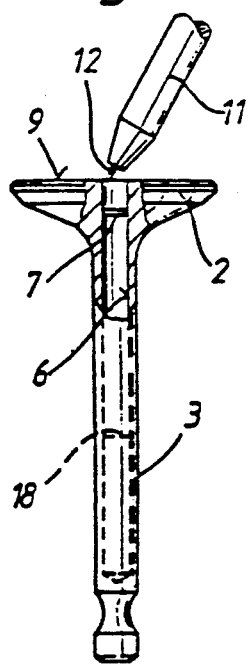
Figure 6:
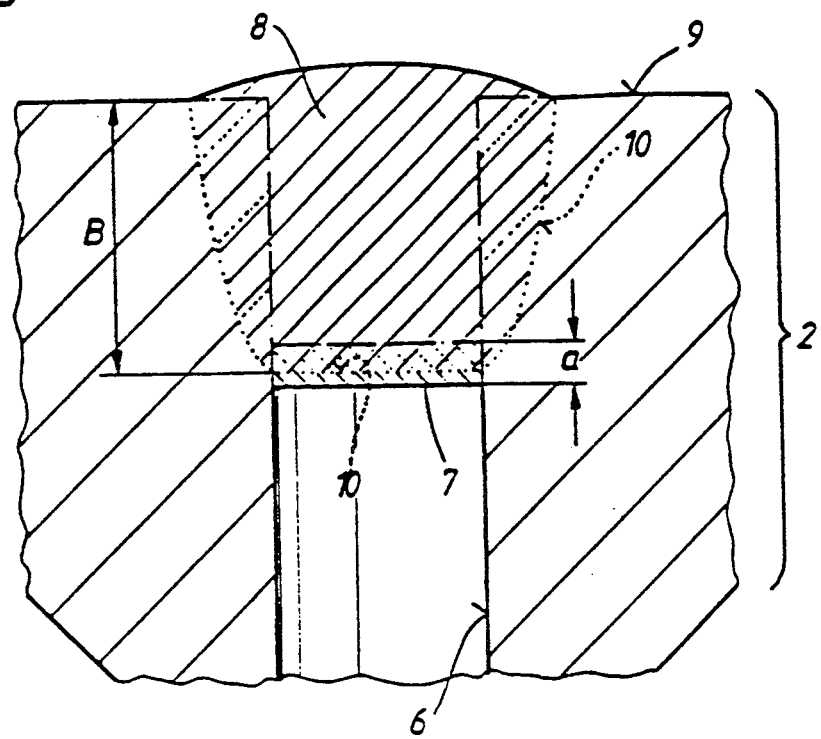
FIG. 6 shows a highly enlarged detailed representation of part of the head-side seal of the gas exchange valve according to FIG. 1.

In the sequence of illustrations of FIGS. 2 to 5, various essential phases in the production of the gas exchange valve according to FIG. 1 are shown. The hollow 6 within the valve stem is cut out by drilling axially from the head side (FIG. 2). A defined quantity of a die-formed formed coolant 18, such as sodium, is inserted into the completed and cleaned drilled hole 6 (FIG. 3). Care should be taken during this process that the sodium comes into contact as little as possible and/or only briefly with air or the oxygen contained therein. With the aid of a centering device 20, indicated only by way of example, and of a ram 21, a small filling piece 7 is pressed into the opening of the drilled hole to a defined depth, the depth to which it is pressed in corresponding approximately to the thickness B of the subsequent sealing plug (FIG. 4). This sealing plug 8 is applied in a further process step, indicated in FIG. 5, by surfacing. The alloyed material, which is of a thermally highly stressable grade and makes up the mass of the sealing plug, is added during welding by means of an electrode which is consumed, or in the form of a powder blown in. The sealing plug 8, which can thus be produced rapidly, simply and economically in terms of material, is represented on a greatly enlarged scale in FIG. 6. It can be seen there that the filling piece 7 initially pressed into the drilled hole 6 to a defined depth has a very small wall thickness (dimension a). This filling piece, made of a cheap sheet steel, holds the welding melt of the surfacing weld at the end of the drilled hole 6 during welding. As can be seen from the contour 10 of the fused region indicated by dotted lines, the filling piece 7 has also melted to a very great extent, as has, intentionally, the former edge zone of the drilled hole 6. During the surfacing carried out with the welding torch 11, material is supplied via the electrode 12, for example, until the upper edge of the weld pool is approximately flush with the free side 9 of the head.

Suitable welding methods for performing such surfacing are TIG, MIG or plasma-arc powder surfacing methods, which are here assumed to be known.

According to experience, these welding methods can be employed with very high reliability, so that if the weld is outwardly good the quality, e.g. tightness, of the weld can also be assumed to be reliable. The surfacing material added in wire form in MIG or TIG welding methods is not very much more expensive than the same material supplied in plate or rod form. Considerable cost savings can be achieved by applying the sealing plugs 8 by the surfacing method due to the elimination of machine waste or punchings of the order of 30 to 40%. The material to be used is very expensive. In addition, the separate production of the sealing plugs and an expensive quality control are eliminated. In the plasma-arc powder surfacing method, which is likewise very reliable, the surfacing material is applied in the form of powder, which is blown into the plasma zone using a shielding gas and applied to the treatment point.

It has already been mentioned that the filling pieces 7 can be punched out of a metal sheet, preferably out of a low-alloy steel, and this can be carried out economically with long tool lives due to the low material strength of this material. The filling piece 7 is preferably designed as a flat blank, as most of the illustrative embodiments depicted show. Other materials, in particular copper, may also be used instead of steel, this favoring heat transfer from the cooling medium to the partially alloyed sealing plug applied by the surfacing method. In addition, the copper, which dissipates the heat of welding better into the valve head, resists burn-through or melt-through better than a steel blank. Other materials, such as brass or aluminum, are of course also suitable, and even plastic, possibly with suitable additives, may be used.

In the case of the illustrative embodiment shown in FIGS. 1 to 6, the filling piece 7 is held non-positively in the region of the opening of the drilled hole by a press fit. A greater or lesser oversize of the diameter of the filling piece 7 in relation to the diameter of the drilled hole 6 is here of little consequence, so that coarse tolerances can readily be permitted. The pressing force and the stability of the valve head 2 will be sufficient in all cases in order to introduce the filling piece 7 in a defined position even in the case of a large oversize without the valve head deforming noticeably thereunder. The press-in depth can be predetermined exactly by corresponding shoulders on the press-in ram, against which the filling piece 7 can be held, for example, magnetically or by suction air.

Figure 7:
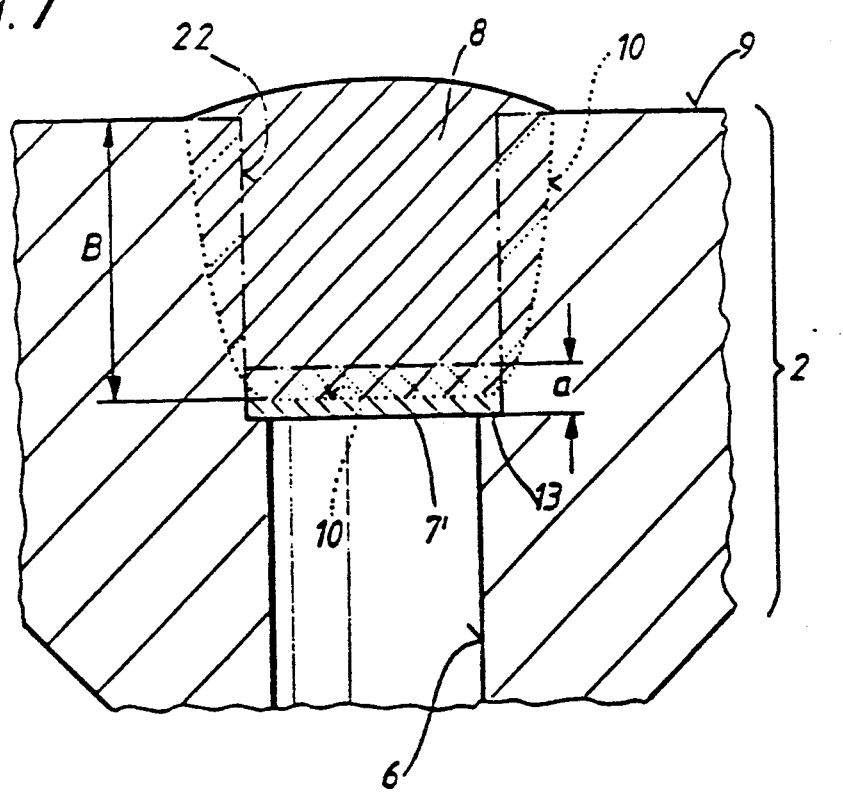
FIGS. 7 to 9 show three different modifications of the head-side cavity seal of a coolable gas exchange valve.

In order to be able to hold the filling piece 7' positively and in a defined position at a particular depth of the drilled hole 6 or at a particular distance from the free side 9 of the head, it is envisaged according to the illustrative embodiment in accordance with FIG. 7 that a cylindrical counterbore 22 be made in the drilled hole 6 on the head side, by means of which counterbore a shoulder 13 is created on which the filling piece 7' can rest positively and in a defined position. The fit of the filling piece 7' within the counterbore 22 may be either a press fit or a clearance fit In other respects, the illustrative embodiment in accordance with FIG. 7 corresponds largely to that in accordance with FIG. 6.

Figure 8:
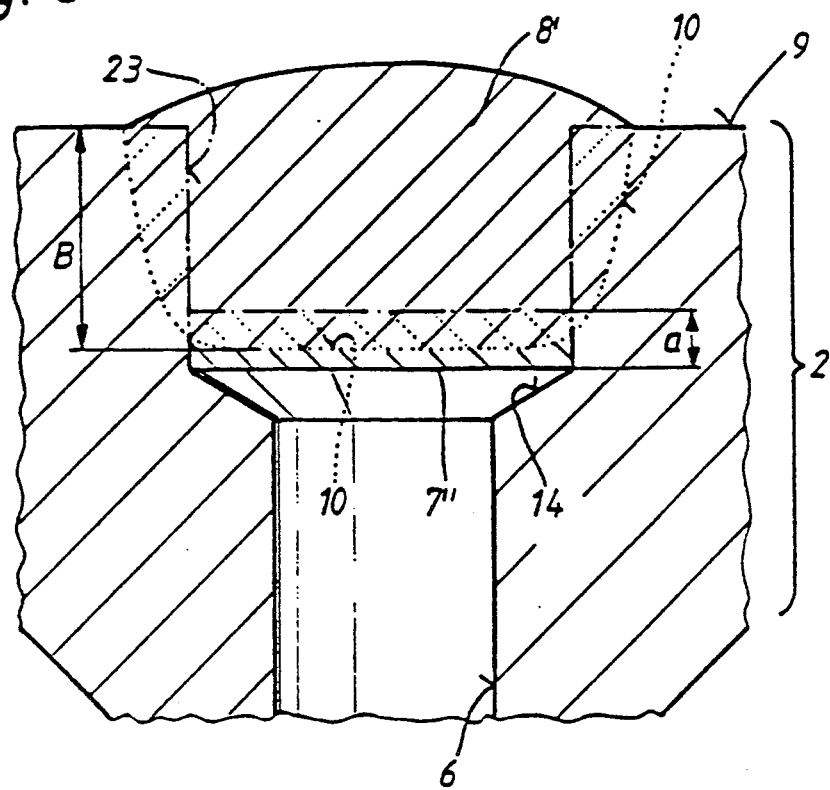

In the case of the illustrative embodiment in accordance with FIG. 8, that end of the drilled hole 6 which is on the head side is enlarged to a larger diameter (enlarged hole 23) and, in the process, a conical transition (hole shoulder 14) to the drilled hole 6 in the valve stem is created. The filling piece 7" is placed loosely or pressed into the enlarged hole 23. In either case, it rests positively against that edge of the hole shoulder 14 which lies nearest to the free side 9 of the head. The essential reason for this configuration is the creation of a larger cooling surface wetted by the coolant, a better cooling effect thereby being achievable. In addition, a reduction in weight can be achieved by enlargement. Of course, this enlarged version also requires a larger filling piece 7" and a sealing plug 8' of larger diameter. Because of the larger heat input during the surfacing, the wall thickness of the filling piece 7" would have to be sufficient to ensure that it did not melt through under the action of this heat input.

Figure 9:
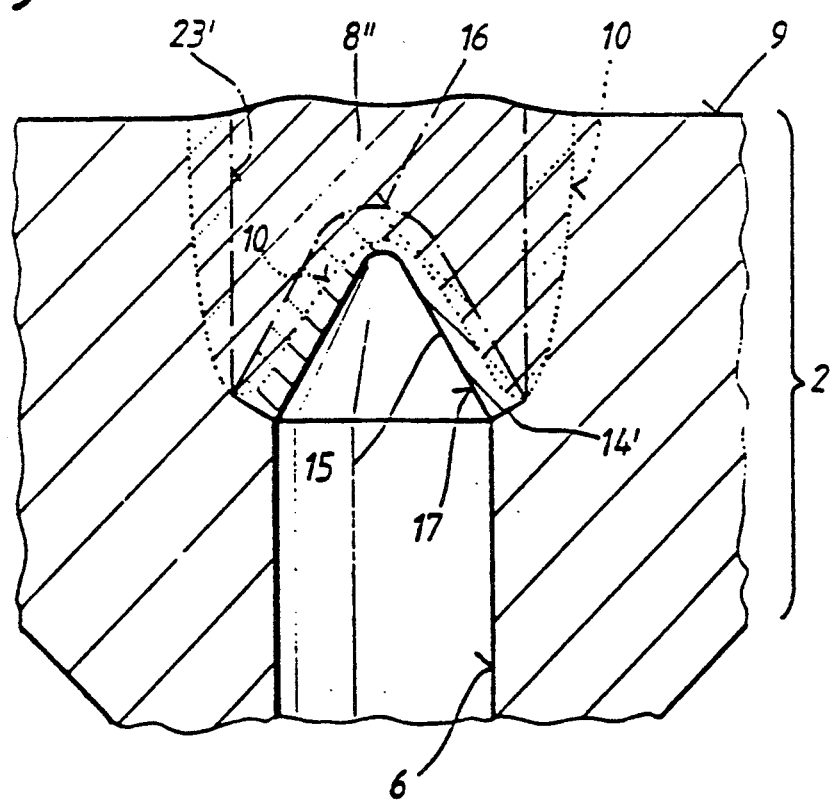

In the case of the illustrative embodiments in accordance with FIG. 9, the filling piece is designed in the form of a frustoconical cap 15. For the reliable retention of the cap 15, there is provided an enlarged hole 23' and a conical hole shoulder 14' in the transitional region to the drilled hole 6 in the valve stem which is on the heat side. The cap 15 is inserted into the enlarged hole 23' with its closed side 16 pointing outwards, the concave-tapered open side 17 of the cap thus facing the inside of the drilled hole in the valve stem. Admittedly, the filling piece designed as a cap 15 cannot be produced as simply as a flat blank. In addition, when the cap is inserted into the enlarged hole 23', care must be taken that it is inserted in the correct direction. However, the configuration in accordance with FIG. 9 has the advantage that less material is required for the sealing plug 8"', reducing the quantity of material and, hence, the cost. In addition, the reduced use of material also has weight advantages, which have a favorable effect on engine operation. Furthermore, the effective cooling surface in the region toward the free side of the head is larger than in the case of a flat configuration of the filling piece. Finally, the wall thicknesses, decisive for heat conduction, can permissibly be less, at least in the region of the center of the drilled hole, than in the other illustrative embodiments, which likewise promotes heat transfer.

Figure 10:
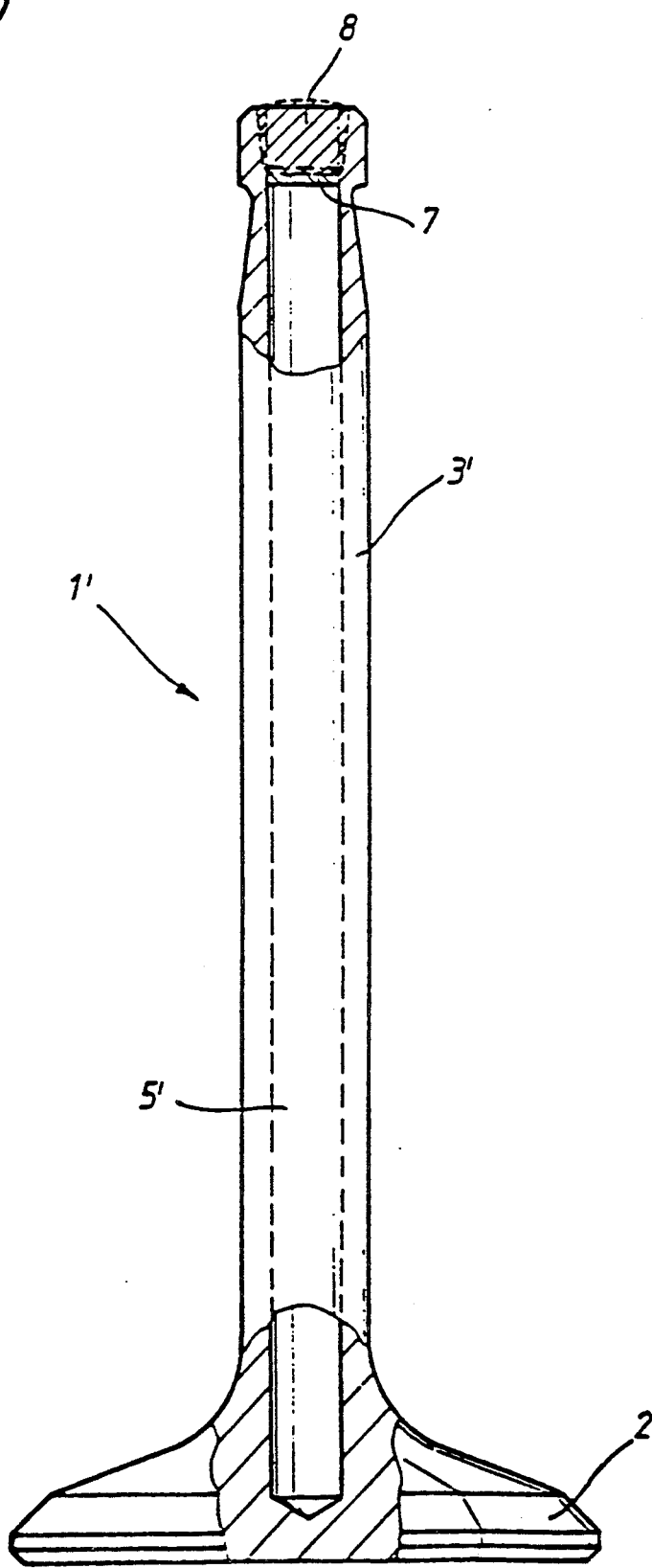
FIG. 10 shows an illustrative embodiment for the sealing of the cavity on the stem side.

In principle the sealing according to the invention of the hollow 5' in the stem 3' of the gas exchange valve 1' is also possible at the free end of the valve stem, as FIG. 10 shows. The hollow gas exchange valve 1' depicted there is drilled hollow not for reasons of cooling but simply for reasons of weight. Otherwise, the open end of the drilled hole is likewise sealed by a filling piece 7 holding the weld pool at the end and by a sealing plug 8 applied by means of surfacing. However, this must be followed by a final machining operation on the circumference and on the front face.

In the welding methods hitherto mentioned, a so-called edge effect can be observed, particularly when relatively small holes are to be welded up. This edge effect is seen in the fact that the current flows preferentially along the path of lowest electrical resistance and, as a result, is concentrated in the edge region. As a result, the filler material is built up preferentially on the projecting workpiece edge situated in the current flow. Such an edge effect makes surfacing from the base of the opening covered by the sealing plug more difficult. In order to avoid such edge effects, methods of surfacing are recommended in which the workpiece is arranged out of and electrically passively in relation to the flow of welding energy melting the added material and the valve material. This general selection criterion for suitable welding methods enables suitable welding methods, for example laser welding or electron beam welding or even gas welding, to be chosen selectively. These welding methods avoid the above disadvantageous edge effects.

Figure 11:
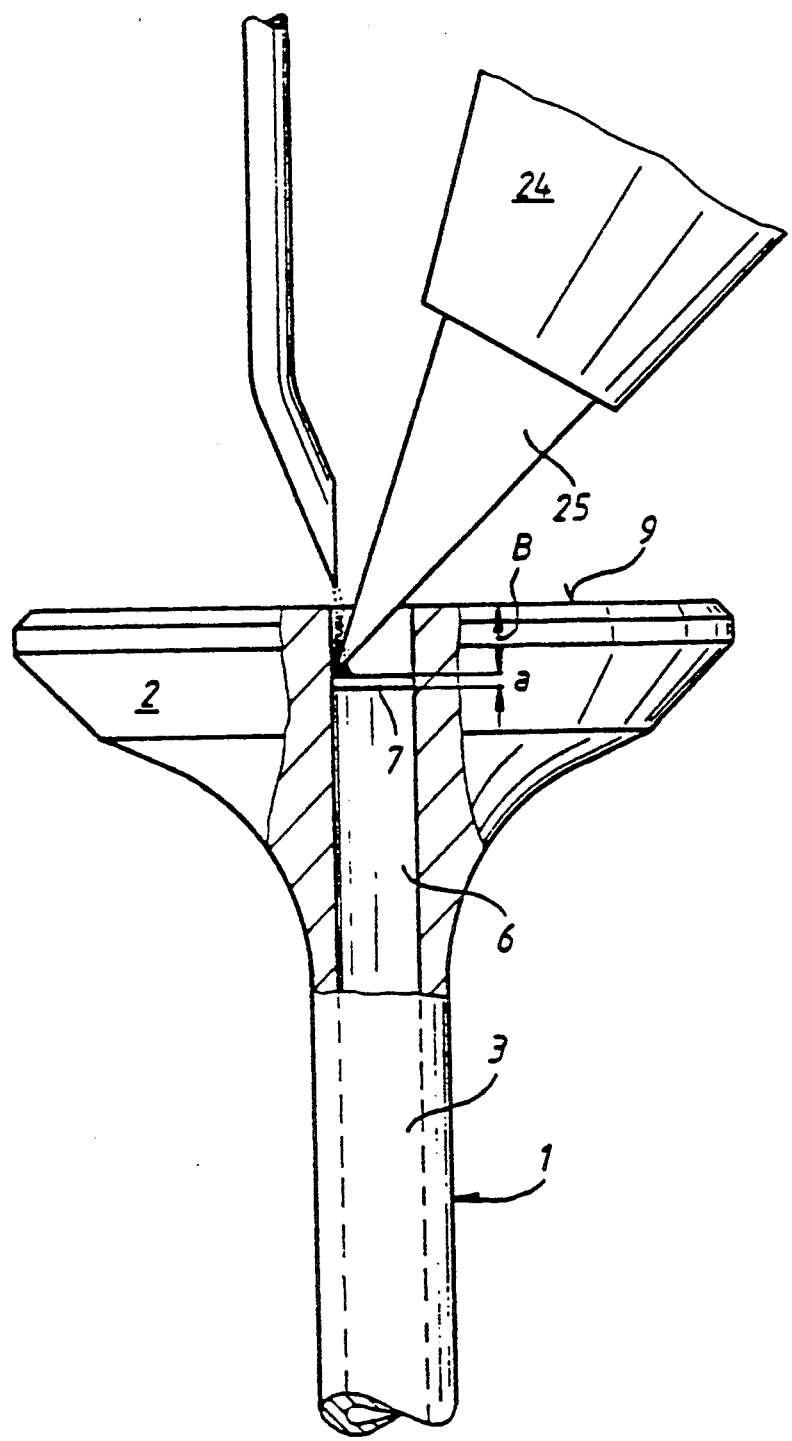
FIG. 11 shows a illustration similar to FIG. 5 but in enlarged representation, illustrating a laser welding procedure.

In the case of the method example depicted in FIG. 11, welding is effected by means of a laser beam 25 emerging from the laser head 24, the powdered filler material being metered to the welding point via a feed tube 26 in accordance with the progress of surfacing. In order to be able to reach all parts of the periphery of the sealing plug by means of the laser head 24, which is assumed to be fixed, the valve 1 is slowly rotated and/or displaced radially relative to the valve position illustrated during the course of surfacing. In this way, the sealing plug can be built up or applied gradually from the bottom, i.e. from the pressed-in filling piece 7. During this procedure, troublesome edge effects do not impair an orderly introduction of the welding melt from the bottom.

Figure 12:
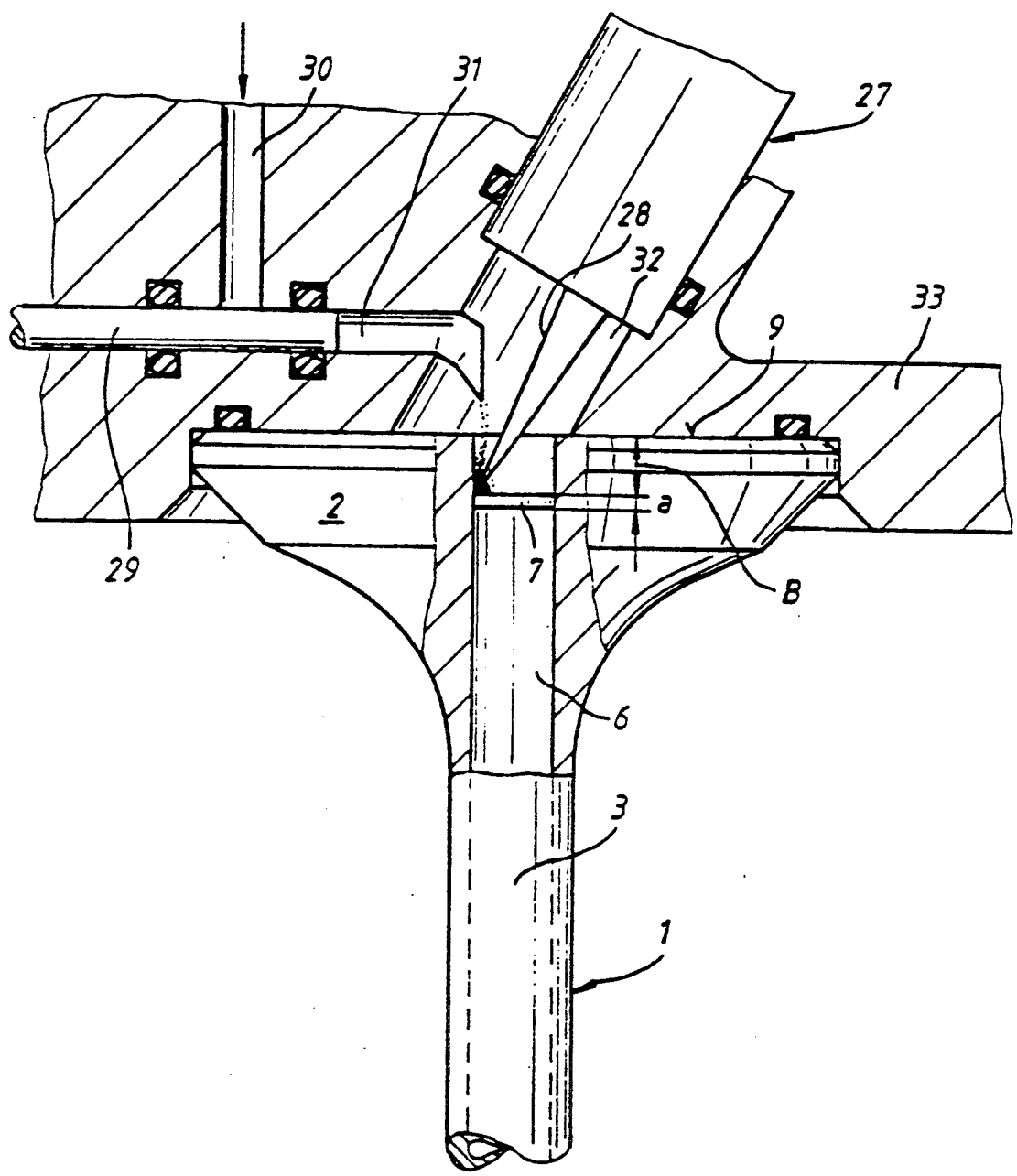
FIGS. 12 and 13 show similar illustrations to that in FIG. 11 but with the surfacing being performed by electron beam welding of two different types.

FIG. 12 shows a very similar arrangement as a conceivable illustrative embodiment, but here an electron gun 27 is provided as energy source for surfacing. The electron gun 27 produces an electron beam 28, which is focused into the region of the subsequent sealing plug. Since, however, a vacuum must be present during electron beam welding, the gas exchange valve is inserted sealingly with the free side 9 of the head into a housing 33, a vacuum chamber 32 towards the front side of the electron gun 27 thus being formed. After the insertion of the gas exchange valve, this vacuum chamber is evacuated, whereupon surfacing can begin. In the case of the method example illustrated in FIG. 12, the filler material is also supplied in the form of powder. However, care must here be taken that the vacuum is not impaired while the powder is being supplied. In the example shown in FIG. 12, the metal powder held ready in a horizontally extending cylindrical metering chamber 31 is pushed out slowly by means of a metering plunger 29 towards the vacuum chamber, where it trickles into the point of beam focus via a chute under the effect of gravity and is fused there. In this method the valve must be displaced in the circumferential direction and/or radially in order to be able to reach all areas of the sealing plug with the focus, although this is not illustrated in FIG. 12. Certain beam displacements can also be performed at the electron gun 27 by corresponding beam deflections. During workpiece changeover, the metering chamber 31 can be refilled from the feed tube 30 by pulling back the metering plunger 29. An ordered filling of the plug volume with high-grade material without troublesome edge effects is also possible by means of electron beam welding.

Figure 13:
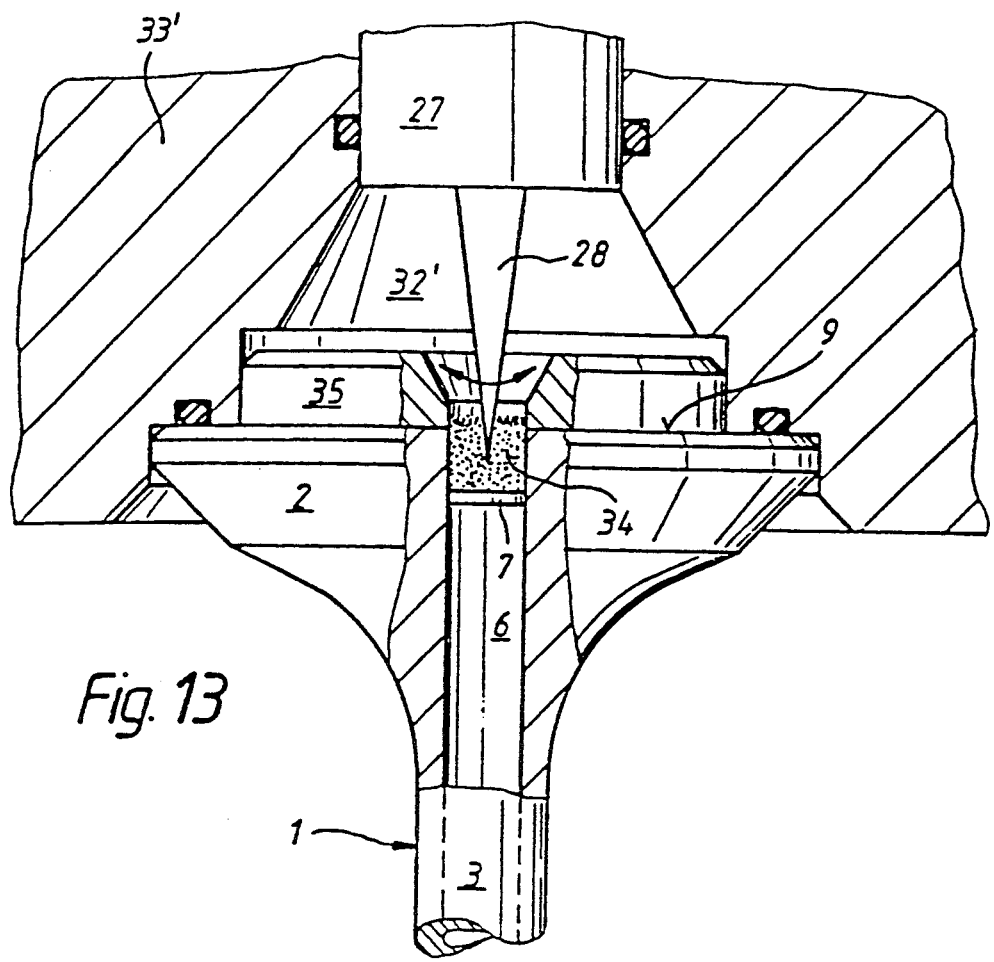

In the method variant of electron beam welding illustrated in FIG. 13, a precisely matched quantity 34 of powder is introduced beforehand into the opening which forms the subsequent sealing plug and is closed off towards the bottom by the filling piece 7. Since, due to its lower bulk density in relation to the density of the solid cross-section, the quantity 34 of powder occupies more space than the molten sealing plug, the excess powder is secured by a ceramic ring 35 placed in a defined position on the free side 9 of the head. The electron beam 28 is moved for a prolonged period in a swinging and circling motion above the quantity of power. The powder is thus fused from above, the fusion front progressing with time through the entire powder fill and reaching the filling piece 7 and the side wall of the drilled hole 6 and starting to melt these too. With increasing fusion, the powder collapses and thus the surface of the weld pool falls, with the result that the electron beam may need to be refocused.

Figure 14:
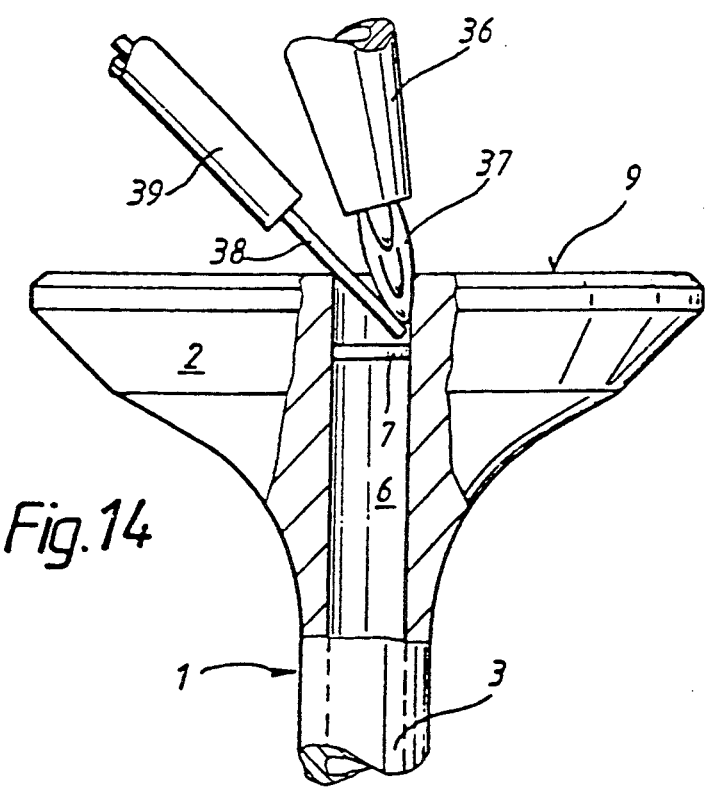
FIG. 14 shows a similar illustration but with the surfacing being carried out by gas welding.

In the case of the illustrative embodiment shown in FIG. 14, surfacing is performed using an oxy-fuel torch 36 producing a small welding flame 37, the surfacing material being supplied in the form of a welding wire 38 via a guide tube 39. The welding wire of a thermally highly stressable grade of material can be held on a large spool.

What is claimed:

1. Method for producing hollow gas exchange valves for reciprocating engines, the gas exchange valves each having a hollow valve stem projecting from a valve head and hermetically sealed with respect to the outside, the method comprising the steps of:
    making a drilled hole open axially at one side in the valve stem;
    inserting a filling piece into the opening of the drilled hole;
    hermetically sealing the opening of the drilled hole by welding; and
    surfacing the opening of drilled hole, the alloyed material making up the mass of a sealing plug, in a thermally highly stressable grade, being added during welding,
    wherein the filling piece is made of a cheap material, the wall thickness of the filling piece being designed to be substantially smaller than the sealing plug and set back at the top by approximately the wall thickness of the sealing plug relative to the edge of the open end of the drilled hole, the filling piece holding the welding melt at the end in the drilled hole during welding.

2. Method according to claim 1, wherein the surfacing is carried out using a welding method in which the valve is arranged out of the flow of welding energy and electrically passively in relation to the flow of welding energy melting the added material and the valve material.

3. Method according to claim 2, wherein the step of surfacing is performed by means of laser welding.

4. Method according to claim 2, wherein the step of surfacing is performed by means of electron beam welding.

5. Method according to claim 2 wherein the step of surfacing is performed by means of gas welding, 6. Method according to claim 1, wherein the step of surfacing is performed by means of TIG welding.

7. Method according to claim 1, wherein the step of surfacing is performed by means of MIG welding.

8. Method according to claim 1, wherein the step of surfacing is performed by means of plasma-arc powder surfacing.

9. Method according to claim 1, wherein the steps of making a drilled hole and hermetically sealing are performed from the head side of the valve stem.

10. Method according to claim 1, wherein further comprising the step of introducing a cooling medium before the step of inserting the filling piece into the drilled hole.

11. Method according to claim 1, wherein further comprising the step of punching the filling piece out of a metal sheet.

12. Method according to claim 1, wherein the filling piece is produced from unalloyed steel.

13. Method according to claim 1, wherein the filling piece is designed as a flat blank.

14. Method according to claim 1, the filling piece is designed as a frustoconical cap and is inserted into the drilled hole with the closed side pointing outwards.

15. Method according to claim 1, further comprising the steps of pressing the filling piece into the drilled hole to a defined depth and sticking the filling piece in with a press fit.

16. Method according to claim 1 wherein the step of making a drilled hole includes making a shoulder, on which the inserted filling piece is positively held and which defines the insertion depth of the filling piece, in the drilled hole.

* * * * *